Figure 1:
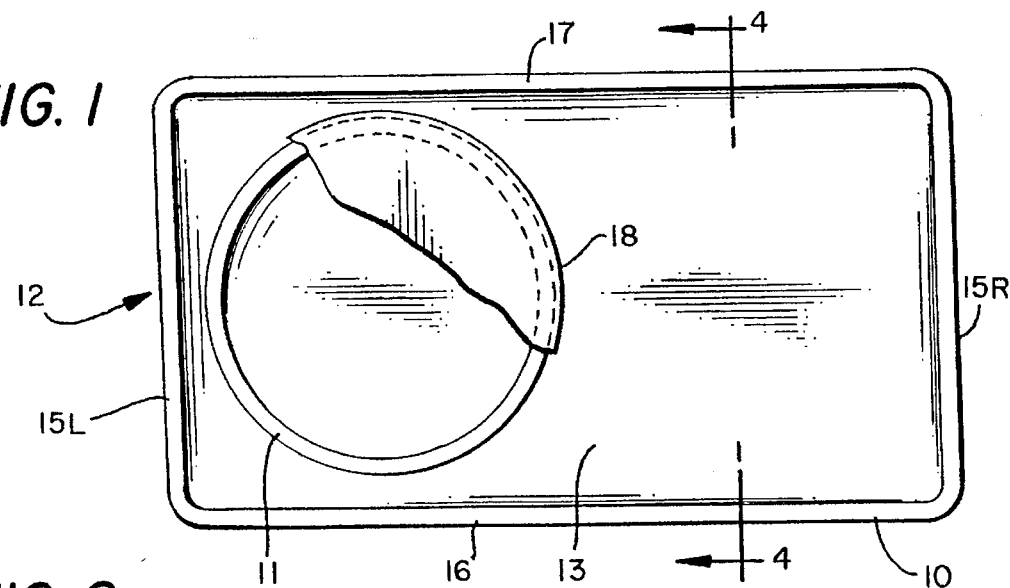

United States Patent [19]

Ybarra

[11] Patent Number: 5,632,228
[45] Date of Patent: May 27, 1997

[54] WATER PROTECTED FOOD DISH IN A WATER DISH

[76] Inventor: Bertha M. Ybarra, 3201 Wyndrock Dr., Abilene, Tex. 79606

[21] Appl. No.: 546,528

[22] Filed: Oct. 20, 1995

[51] Int. Cl.[6] .................. A01K 5/01; A01K 7/00
[52] U.S. Cl. .................................. 119/51.5
[58] Field of Search .................. 119/51.5, 61, 72

[56] References Cited

U.S. PATENT DOCUMENTS

| D. 326,742 | 6/1992 | Tart | 119/61 X |
|---|---|---|---|
| 2,543,465 | 12/1951 | Morey | 119/61 |
| 4,128,080 | 12/1978 | Haney | 119/51.5 |
| 4,357,905 | 11/1982 | Carpenter | 119/61 |
| 4,532,891 | 8/1985 | Jones | 119/51.5 X |
| 4,896,627 | 1/1990 | Riddell | 119/51.5 |
| 5,117,778 | 6/1992 | Imamura | 119/51.5 |
| 5,125,363 | 6/1992 | McGaha | 119/51.5 |
| 5,277,149 | 1/1994 | East | 119/51.5 |
| 5,485,806 | 1/1996 | Watanabe | 119/51.5 |

*Primary Examiner*—Robert P. Swiatek
*Assistant Examiner*—Yvonne R. Abbott
*Attorney, Agent, or Firm*—Harrison & Egbert

[57] ABSTRACT

A food container for a dog (or cat) is placed in a larger elongate water container with the food container surrounded by water to keep ants and other insects away from the animal food. The larger elongate water container is long enough that with the food container placed toward one end thereof the using animal uses the other end to drink water.

3 Claims, 1 Drawing Sheet

WATER PROTECTED FOOD DISH IN A WATER DISH

This invention relates in general to providing food and drink to animals, and more particularly, to an elongate water dish and food dish combination for animals, such as dogs, with the food dish surrounded by water to keep ants and other insects away from the food and for the animal to drink from the other end of the water dish.

Food and water for pets is usually supplied to them in completely separated and unrelated containers. Such food containers particularly when used outside, tend to attract ants and all kinds of insects and, while a dog or cat may not pay particular attention to this it can be quite distasteful to the pet owner. Any approach that would help solve the ant and insect problem would be an improvement.

It is therefore a principal object of this invention to serve food and water to pets with minimal insect interference both indoors and out.

Another object is to make the serving of food and water to pets as sanitary as possible.

A further object is to make the serving of food and water for pets as easy and convenient as possible.

Still another object is to provide a combined food bowl and water dish easy to clean and service as one article used in feeding and watering pets.

Features of the invention useful in a water protected food dish positioned in an elongate water dish, include a food container for a dog (or cat) that is placed in a larger elongate water container with the food container surrounded by water to keep ants and other insects away from the animal food. The larger elongate water container is long enough that with the food container placed toward one end thereof the using animal uses the other end to drink water. A plastic lid is also provided for the food container to keep flies away until the food container is opened to serve the food to a pet. The food dish may be bonded in place in the water dish forming a unitary food serving and water dish unit as a matter of convenience.

Specific embodiments representing what are presently regarded as the best modes of carrying out the invention are illustrated in the accompanying drawings.

Figure 2:
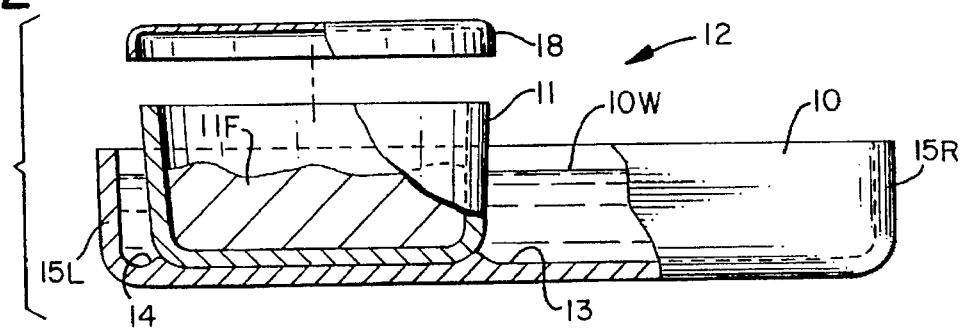
Figure 3:
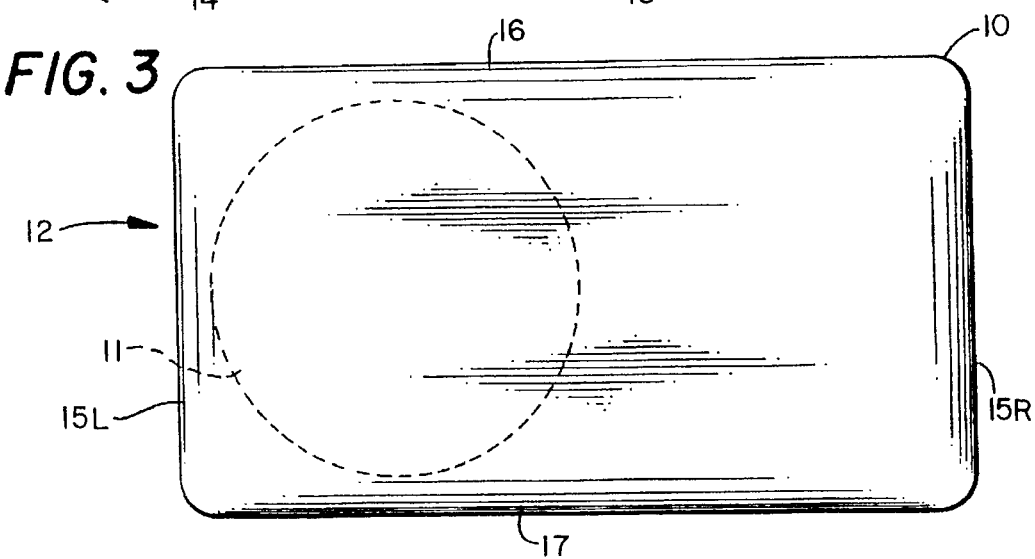
Figure 4:
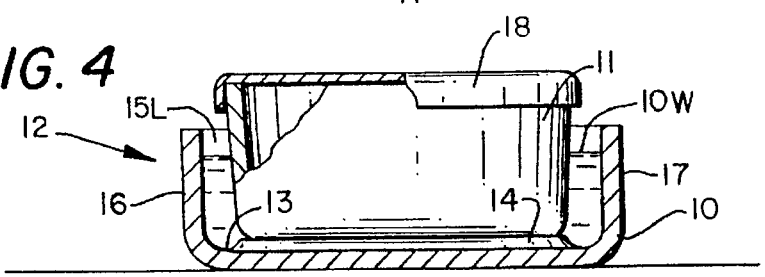

In the drawing:

FIG. 1 represents a top plan view of a rectangular elongate walled dish with a round food dish in place at one end of the watering dish;

FIG. 2, a partially broken away side elevation view of the water dish and a food bowl in place therein surrounded by water;

FIG. 3, a bottom plan view of the watering dish; and,

FIG. 4, a partially broken away and sectioned end view of the water dish and the food bowl in place therein.

Referring to the drawing:

The water dish 10 and food bowl 11 combination 12, of FIGS. 1–4, is shown to have the food bowl 11 placed in the water dish bottom 13 bowl rim 14 at one end of the rectangular elongate water dish 10 yet with water in space between the adjacent end 15L and sides 16 and 17. The water dish 10 end 15R is spaced widely enough from the bowl 11 for a pet to easily drink water 10W therefrom. Food bowl 11 is also provided with a plastic closure top 18 to keep flies from the food 11F in bowl 11 until it is time to feed a pet.

In another embodiment the food bowl 11 is bonded to the inside water dish 10 bottom 13 by a bonding agent to make the food bowl 11 and water dish 10 a unitary combination 12 for both food and water.

Whereas this invention has been described with respect to several embodiments thereof it should be realized that various changes may be made without departing from the essential contributions to the art made by the teachings thereof.

I claim:

1. An elongate water dish and food dish combination for pet animals comprising:

an elongate water dish with a first end and a second end and side walls;

a food dish sized and positioned in said elongate water dish to be surrounded by water from all sides within the water dish and having a water space within said elongate water dish for water drinking by a pet animal, said food dish being provided with a cover to protect pet food from flying insects, said cover being removable when a pet is to be fed; and a position holding means provided on a top surface of said water dish for receiving said food dish, said position holding means having a food dish receptacle rim at one end of the water dish, said water dish having water in a space between the food dish and the first end of said water dish and in a space between the food dish and the side walls of said water dish, the second end of the water dish being spaced widely enough from the food dish for a pet to drink water therefrom, said water dish having a rectangular elongate configuration.

2. The elongate water dish and food dish combination for pet animals of claim 1, wherein said water dish is rectangular with opposite ends and opposite sides: said food dish is round between a mount base and an upper rim; and the food dish upper rim is spaced above the level of water in said water dish and above the top edges of the water dish opposite ends and opposite sides.

3. An elongate water dish and food dish combination for pet animals comprising:

an elongate water dish with an end wall and side walls;

a food dish sized and positioned in said elongate water dish to be surrounded by water from all sides within the water dish, and for a water space within said elongate water dish for water drinking by a pet animal, said food dish being provided with a cover to protect pet food from flying insects, said cover being removable when a pet is to be fed; and position holding means on a top surface of said water dish receiving said food dish, said position holding means includes a food bowl receptacle rim at one end of the water dish, said water dish having water in a space between the food dish and a first adjacent end and between the food dish and opposite sides of said water dish, a second end of the water dish being spaced widely enough from the food dish for a pet to easily drink water therefrom, said water dish having a rectangular elongate configuration.

\* \* \* \* \*